United States Patent [19]

Cheatum

[11] 4,407,190
[45] Oct. 4, 1983

[54] BALE DISCHARGE GATE LATCH ASSEMBLY FOR CYLINDRICAL BALER

[75] Inventor: Leo G. Cheatum, Ottumwa, Iowa

[73] Assignee: Deere & Company, Moline, Ill.

[21] Appl. No.: 382,884

[22] Filed: May 28, 1982

[51] Int. Cl.³ .................. B30B 5/06; A01D 43/02; E05C 3/16
[52] U.S. Cl. ..................... 100/88; 292/221; 56/341
[58] Field of Search ............ 100/88; 56/341, 343; 292/65, 127, 221

[56] References Cited

U.S. PATENT DOCUMENTS

| | | | |
|---|---|---|---|
| 3,968,632 | 7/1976 | Gaeddert et al. | 56/341 |
| 4,150,527 | 4/1979 | Meiers | 56/341 |
| 4,375,187 | 3/1983 | Kluver et al. | 100/88 |

OTHER PUBLICATIONS

Operator's Manual OM-E61920 Issue K7 for the John Deere Model 510 Round Baler, pp. 13, 14, 20 and 21.
Hesston Advertising Brochure entitled Rounder Open-Throat Round Balers RB-1-379, copyrighted by Hesston Corp. 1979.

Primary Examiner—Harvey C. Hornsby
Assistant Examiner—Shewen Bian

[57] ABSTRACT

A latch assembly for a cylindrical baler for latching a bale discharge gate to the front section of the baler. The bale discharge gate is moveable by a hydraulic cylinder back and forth between a closed position for bale formation and open position for bale discharge. The latch assembly includes a latch member fixed to the front section of the baler; a latch hook, for engaging the latch member, pivotably mounted to the gate; and an actuator arm connected between the latch hook and the hydraulic cylinder for engaging and disengaging the latch hook with the latch member responsive to the retraction and extension of the cylinder. The improvement comprises a resiliently biased slidable connection between the latch hook for permitting the actuator arm to be moved responsive to the retraction of the cylinder plunger even though the latch hook may be restrained from movement due to misalignment of the latch hook with the latch member.

2 Claims, 3 Drawing Figures

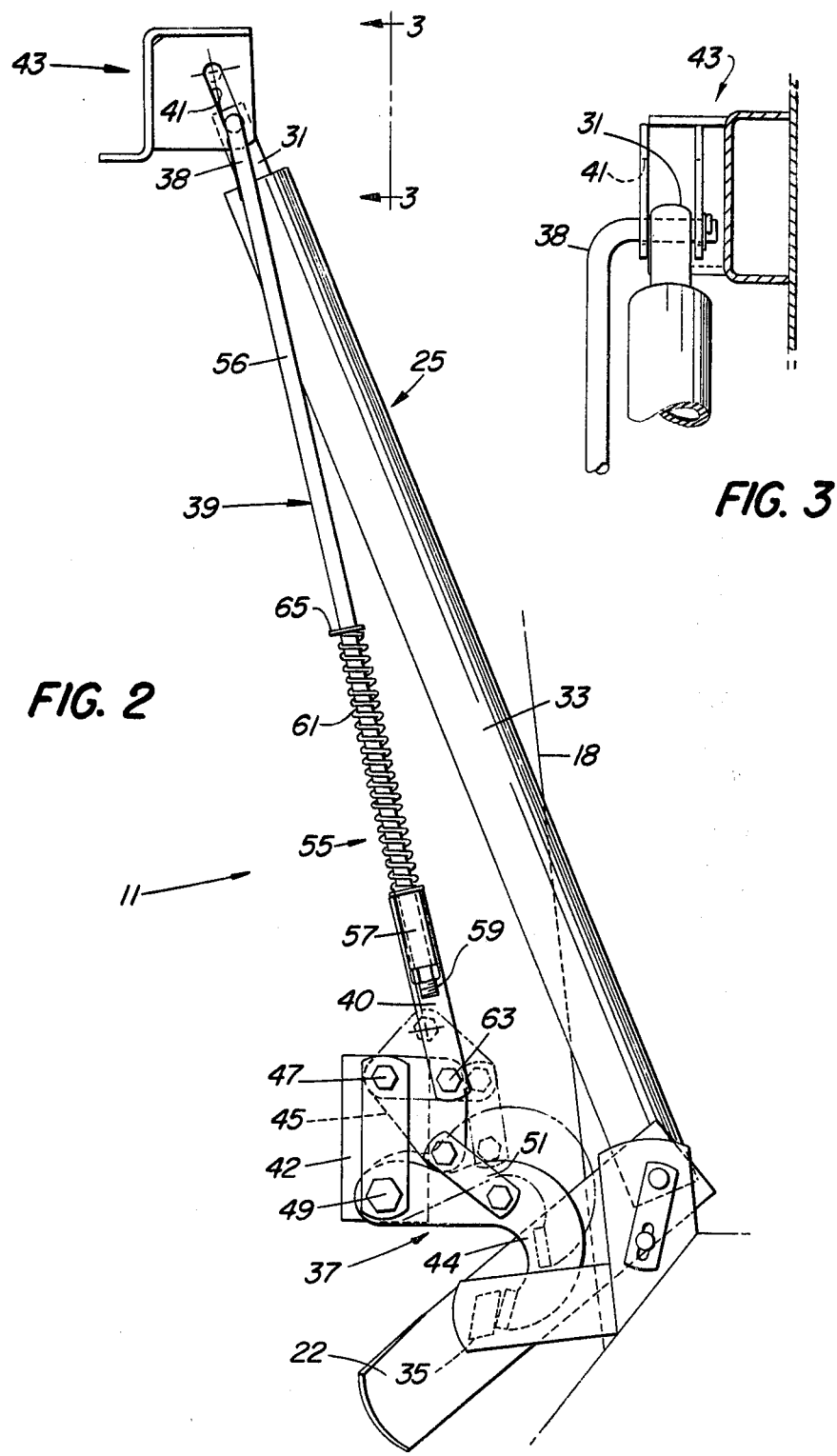

BALE DISCHARGE GATE LATCH ASSEMBLY FOR CYLINDRICAL BALER

BACKGROUND OF THE INVENTION

This application relates to balers for forming cylindrical bales and more particularly relates to a bale discharge gate latch assembly for such balers.

One commercially available baler is comprised of a frame having a pair of spaced sidewalls. Each sidewall includes a front and a rear segment. The rear sections constitute a bale discharge gate and are pivotably mounted to the front segments which constitute a front frame section. The gate is moveable by a hydraulic cylinder, between an open position for bale discharge and a closed position for bale formation. A latch assembly is provided for locking the gate to the front frame section of the baler automatically after the gate has reached its closed position. The latch assembly includes (1) a latch member fixed to the front section of the baler, (2) a latch hook mounted on the gate for engaging and disengaging the latch member and (3) an actuator arm connected between the latch hook and the one end of the hydraulic cylinder for engaging and disengaging the latch hook with the latch member responsive to the retraction and extension of the cylinder.

One problem which has been encountered in the use of such a latch mechanism is that if the latch hook is not properly positioned relative to the latch member, (for example, when the bale gate is not completely closed) the latch hook will hit the latch member and be restricted from free movement to engage the latch member properly. This often results in causing damage to the latch assembly, particularly the actuator arm which may be bent to accommodate the movement of the hydraulic cylinder into its fully retracted position.

OBJECTS AND SUMMARY OF THE INVENTION

Accordingly, it is an object of this invention to provide a cylindrical baler with an improved latch assembly which is less subject to damage.

Another object of the invention is to provide a cylindrical baler with an improved latch assembly which includes a means for permitting the hydraulic control cylinder to assume a fully retracted position, even though the latch hook and latch member may be misaligned, witout damaging the latch assembly.

These, and other objects of this invention, which will be apparent from a consideration of the following detailed description are accomplished by a cylindrical baler comprising a front section and a bale discharge gate pivotably mounted to the front section. A hydraulic cylinder is used to move the bale discharge gate back and forth between a closed position for bale formation and an open position for bale discharge. A latch assembly locks the bale discharge gate to the front section of the baler following closing of the gate. The latch assembly includes (1) a latch member fixed to the front section, (2) a latch hook for engaging and disengaging the latch member and (3) an actuator means connected between the latch hook and the hydraulic cylinder for engaging and disengaging the latch hook with the latch member responsive to the retraction and extension respectively of the cylinder. The improvement in the latch assembly resides in the actuator means having a lost motion means connecting an actuator arm to the latch hook for permitting the actuator arm to be moved responsive to the retraction of the cylinder without moving the latch hook as may occur when the latch hook is restrained from movement due to misalignment with the latch member.

In accordance with the preferred embodiment, the lost motion means comprises a sleeve fixed to the latch hook for slidably receiving the actuator arm therein and a spring on the arm and extending between a stop on the arm and one end of the sleeve. The spring biases the arm toward an extended position relative to the sleeve. If the latch hook is restraind from movement, the actuator arm is moveable through the sleeve against the bias of the spring when the cylinder is moved into its fully retracted position.

BRIEF DESCRIPTION OF THE DRAWINGS

FIG. 2 is an enlarged view of the latching assembly for the bale discharge gate of the baler shown in FIG. 1. The latched position is shown in solid lines and the unlatched position is shown in dotted lines.

FIG. 3 is a fragmentary view of the latch assembly taken along line 3—3 of FIG. 2.

DESCRIPTION OF THE PREFERRED EMBODIMENT

Figure 1:
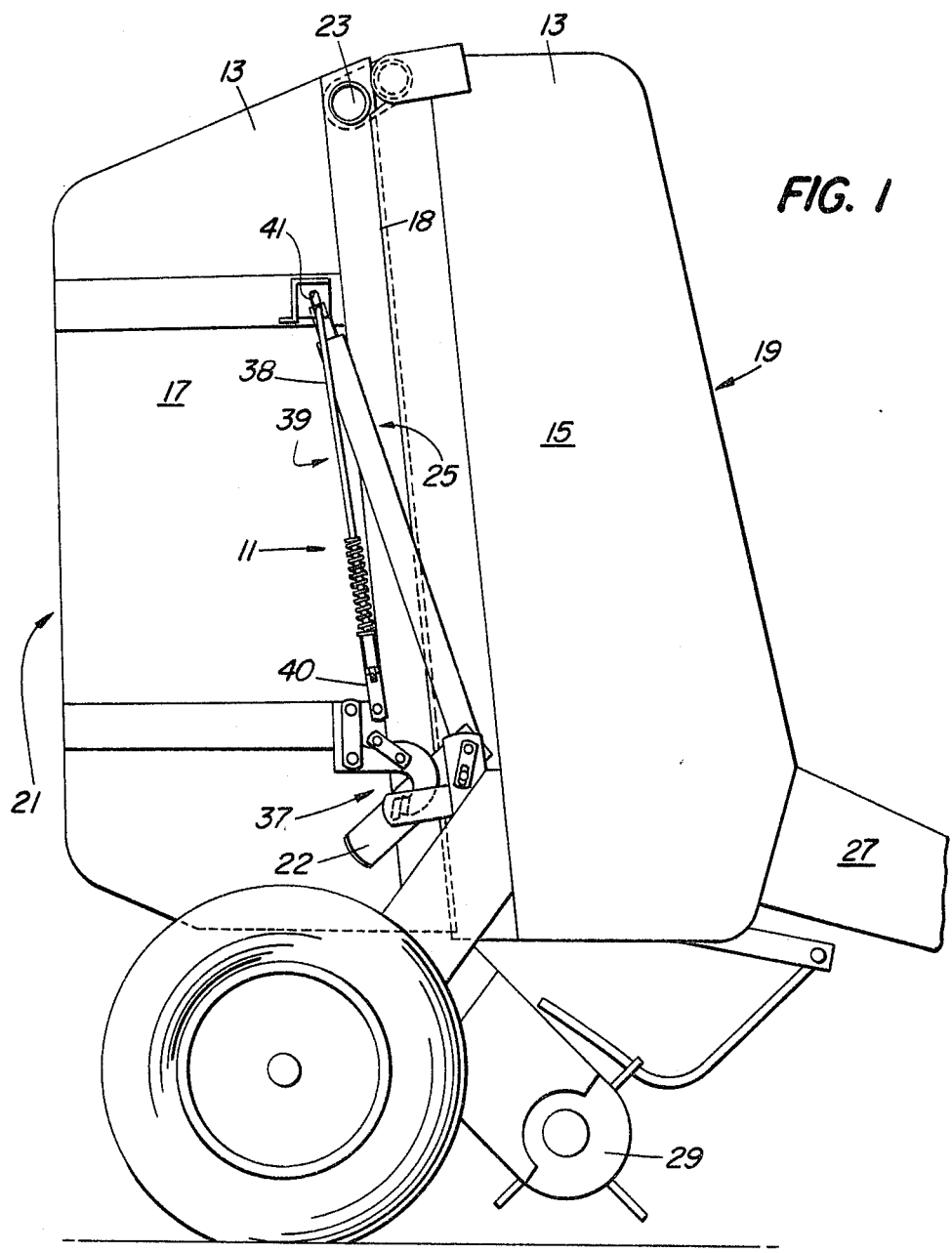
FIG. 1 is an elevational view of the right side of a cylindrical baler in accordance with features of this invention.

Reference is now made to FIG. 1, illustrating a preferred embodiment of a baler for forming cylindrical bales in accordance with the features of this invention. The invention herein resides in an improved latch assembly 11. The baler other than the latching mechanism 11 is identical to that described in detail in U.S. application Ser. No. 308,233, filed Oct. 5, 1981 in the name of Koning, et al and entitled Belt Tensioning System for Round Bales. The disclosure of this application is hereby incorporated by reference herein. For convenience the baler will only be briefly described herein. The baler is generally comprised of a pair of opposed sidewalls 13 (only one being shown) a plurality of longitudinally extending side by side belts (not shown) supported on a plurality of rollers (not shown) extending between the sidewalls 13. A bale forming chamber is defined by the sidewalls of the baler, the rollers and the belts. The sidewalls 13 are partitioned along parting line 18 into a front segment 15 and a rear segment 17. The front sidewall segments 15 constitute a front frame section 19 and the rear sidewall segments 17 constitute a bale discharge gate 21 pivotably mounted to front section 19 on a pivot 23. The bale discharge gate 21 is moveable back an forth between a closed position for bale formation and an open position for bale discharge by means of hydraulic cylinder 25. Cylinder 15 is preferrably operated by the hydraulic control circuit disclosed in U.S. application Ser. No. 308,223, but it may be operated by any other conventional hydraulic control circuit for the purpose of the invention herein. The control circuit forms no part of the invention herein.

The location of gate 21 relative to frame section 19 is aided by a pair of guides 22 (only one shown) extending rearwardly from frame section 19.

In the general operation of the baler, the baler is drawn through the field by a tractor (not shown), attachment to a tongue 27. Hay is fed into the bale forming chamber from a windrow on the ground by a pickup 29. In the baler, the hay is rolled in spiral fashion into a cylindrical bale. Upon completion, the bale is wrapped with twine and is discharged by actuation of cylinder 25 to open gate 21 permitting the completed bale to fall onto the ground.

Reference is now made to FIGS. 2 and 3, showing an enlarged view of a latch assmbly 11 for latching bale discharge gate 21 to front frame section 19 in accordance with the features of this invention herein. Latch assembly 11 is automatically unlatched by the first stage of the extension of a piston rod 31 from a cylinder housing 33 of cylinder 25 and is automatically latched following closure of gate 21 by the final stage of the retraction of piston rod 31 into housing 33. In FIG. 2, the latched position is shown in solid lines and the unlatched position is shown in dotted lines. Latch assembly 11 includes a latch member 35 fixed to front frame section 19, a latch hook 37 for engaging and disengaging latch member 35, and an actuator means 39 connected at one end 38 to latch hook 37 and at the other end 40 to piston rod 31. Latch hook 37 includes a latch finger 44 pivotably mounted by a pivot 49 of a bracket 42 on gate 21, a crank 45 pivotably mounted at 47 in bracket 42, and a link 51 pivotably connected between crank 45 and finger 44. End 38 of actuator means 39 is slideably moveable in a slot 41 of a bracket 43 fixed to gate 21. Slot 41 permits means 39 to be initially moved upwardly in FIG. 2 to disengage latch hook 37 from latch member 35 as the hydraulic cylinder 25 is first extended and downwardly in FIG. 2 at the last stage of retraction of the cylinder 25 to engage latch hook 37 with latch member 35 following closure of gate 21.

In accordance with the features of this invention, actuator means 39 further includes a lost motion means 55 for permitting cylinder 25 to be fully retracted without moving latch hook 37. In the preferred embodiment lost motion means 55 connects an actuator arm 56 to latch hook 37 for permitting arm 56 to be moved responsive to the retraction of piston 31 without moving latch hook 37. Movement of latch hook 37 may be prevented by engagement with latch member 35 due to misalignment which may be caused for example by the gate 21 not being completely closed when arm 56 is moved downwardly by cylinder 25. Lost motion means 55 includes a sleeve 57 for slideably receiving an end 59 of arm 56 and a spring 61 on arm 56 extending between a stop 65 and one end of sleeve 57. Sleeve 57 is pivotably mounted to crank 45 at pivot 63 for actuation of latch hook 37 responsive to movement of arm 56. Spring 61 serves to bias arm 56 upwardly in FIG. 2 to make arm 56 rigid with sleeve 57 under normal conditions. Arm 56 is moveable against the bias of spring 61 through sleeve 57 to accommodate downward movement of arm 56 even though latch hook 37 is immobilized due to misalignement with latch member 35.

It will be appreciated that the lost motion means may be constructed in many forms. Further such means 55 may be positioned to any location between latch hook 37 and cylinder 25 so as to accommodate full retraction of cylinder 25 even though latch hook 37 is immobilized.

In operation of latch assembly 11, following completion of the formation of a bale in the baler, latch assembly 11 is in the latched position as shown in solid line in FIG. 2. The hydraulic cylinder 25 is then actuated to extend piston 31 upwardly in FIG. 2. At the first stage of the extension of piston 31, arm 56 and sleeve 57 is moved upwardly in FIG. 2 by way of the connection of arm 56 to piston rod 31 until end 38 engages the upper end of slot 41. At this point upward movement of arm 56 ceases. Upward movement of arm 56 and sleeve 57 rotates crank 45 about pivot 47 to rotate finger 44 counterclockwise about pivot 49, resulting in the disengagement of latch hook 37 with latch member 35. The unlatched position of assembly 11 is shown in dotted lines in FIG. 2. Following disengagement to latch hook 37 with latch member 35, the bale gate 21 is free to open. When further upward movement of arm 56 is prevented, further extension of cylinder 25 acts to separate bale discharge gate 21 from front frame section 19 along parting line 18 by pivotal movement of gate 21 on pivot 23. During this secondary stage of cylinder extension, assembly 11 moves with gate 11. Following bale ejection, the hydraulic cylinder 25 is retracted. During the first stage of retraction, the weight of the bale discharge gate causes the upper end of slot 41 to remain in engagement with arm 56 until gate 21 reaches a closed position in which no further pivoting of gate 21 counterclockwise about pivot 21 is possible. During this stage of retraction, assembly 11 moves with gate 21. Following closing of gate 21, piston rod 31 continues to retract which results in the downward movement of arm 56 and sleeve 57 relative to gate 21 until arm 56 reaches the lower end of slot 41. Downward movement of sleeve 57 causes crank 45 to pivot about pivot 47 to rotate latch finger 44 clockwise about pivot 49 until latch hook 37 engages latch member 35.

Lost motion means 55 is operable to prevent damage to assembly 11 and to actuation arm 56, particularly, if downward movement of actuation arm 39 is begun prior to complete closure of gate 21 which may happen, for a variety of reasons. For example, a wad of hay or foreign material may prevent gate 21 from tightly contacting frame section 21 along parting line 18. Also, the premature movement of arm 39 may occur because piston rod 31 retracts faster than gate 21 is being closed. This may occur, for example, if the baler is on a steep hillside which causes gate 21 to contact guides 22 with enough interference to retard gate movement or if the tractor operator stops the hydraulic oil flow too soon and then starts it again just prior to closing the gate 21. In this latter case, the oil flow and piston rod movement are faster than the speed of gate closure due to the gravity force thereon. In this event, latch hook 37 may engage the top of latch member 35 and be prevented from clockwise rotation about pivot 49. Even though rotation of latch hook 37 is prevented, cylinder 25 continues to retract focing actuation arm 56 downwardly through the sleeve 57 against the bias of spring 61. Thus, the lost motion means 55 prevents actuation arm from being damaged in such an occurance.

The invention herein has been described in connection with a preferred embodiment thereof. Other modifications and embodiments of the invention will be apparent to those skilled in the art. Accordingly, it is intended that the appended claims cover all such modifications and embodiments as are within the true spirit and scope of the invention claimed herein.

I claim:
1. In a cylindrical baler comprising:
   a front section;
   a bale discharge gate pivotably mounted to said front section;
   a hydraulic cylinder for moving said bale discharge gate back and forth between a closed position for bale formation and an open position for bale discharge;

a latch assembly including:

(1) a latch member fixed to said front section, (2) a latch hook on said gate for engaging and disengaging said latch member, and (3) an actuator means connected at one end to said latch hook and at the other to said hydraulic cylinder for engaging and disengaging said latch hook with said latch member responsive to the retraction and extension respectively of said cylinder, said actuator means comprising lost motion means for permitting the full retraction of said cylinder without moving said latch hook;

the improvement wherein:

said actuator means comprises an arm connected at one end to said cylinder and having a stop fixed thereon; and said lost motion means includes (1) a sleeve fixed to said latch hook for slidably receiving the other end of said actuator arm therein and (2) a spring on said arm and extending between said stop and one end of said sleeve, said spring biasing said arm relative to said sleeve.

2. The baler of claim 1 further comprising a bracket fixed to said gate and having a slot formed therein receiving said one end of the actuator arm, said cylinder movable in said slot during an initial stage of the extension of said cylinder to disengage said latch hook from said latch member and during a final stage of the retraction of said cylinder to engage latch hook with said latch member.

* * * * *